UNITED STATES PATENT OFFICE.

GERHARD NICOLAAS VIS, OF PARIS, FRANCE.

PROCESS OF ISOLATING SALTS OF CHROMIUM.

1,324,328.  Specification of Letters Patent.  Patented Dec. 9, 1919.

No Drawing.  Application filed January 22, 1918. Serial No. 213,205.

*To all whom it may concern:*

Be it known that I, GERHARD NICOLAAS VIS, of 10 Rue de Vienne, Paris, France, chemist, have invented a new and useful Improvement in Processes for Isolating Salts of Chromium, which improvement is fully set forth in the following specification.

There are two main processes for the disintegration of chrome ores with the object of obtaining chromates: first, processes which avoid fusion and which employ sodium and potassium carbonates, it may be with other products, air passing over these mixtures while at very high temperatures; secondly, processes in which it is sought to fuse the mass at a lower temperature in order that air can bubble through the molten mass: sodium or potassium hydrates are employed in the processes, it may be together with other bodies.

In both cases, a mass is obtained which contains besides chromate, a series of other salts soluble in water, such as carbonates, hydrates, silicates and aluminates (of sodium or of potassium). In processes at present in use these are separated as follows:— Some are removed by crystallization and the remainder by precipitation with chalk; the process, however, is always complicated, and if the last traces of hydrates are to be removed, wearisome.

The present process avoids these complications and as waste products in the manufacture are reduced to a minimum, allows the yield to be increased; it is particularly simple and avoids the employment of large quantities of water and pure chromates are directly obtained.

The process in question consists of two phases: firstly, the separation of the caustic alkali alone from crude or already purified chromates, whether they are in a solid state, or in solution; secondly, the separation of the silicates, aluminates, carbonates or hydrates from the chromium salts whether crude or already purified and whether solid or in solution.

Each phase may be carried out separately or the two phases may be combined: They are applicable either alone or combined to chromates manufactured according to the two types of process before mentioned, or by any other process.

The first phase, that is, the removal of the caustic alkalis, is carried out with the aid of organic solvents, such as ethyl alcohol, methyl alcohol, acetone, etc., singly or mixed together; potassium and sodium hydrates being relatively soluble in these solvents may be very easily extracted, leaving behind the insoluble chromates, carbonates, aluminates and silicates. Ethyl alcohol, whether pure or de-natured, is particularly applicable to this separation. If the crude mass resulting from the disintegration of the chromium ore with caustic soda or potash or with sodium or potassium carbonate is treated (it may be in conjunction with other salts or products, such as, for example, chalk) with ethyl alcohol, sodium and potassium hydrate pass very easily into solution, while the chromates remain undissolved together with the silicates, aluminates and carbonates as well as the oxid of iron formed during the disintegration of the ore.

Preferably the mass resulting from the disintegration is brought to the state of powder or granules.

By distilling off the alcohol caustic alkalis are obtained in a dry or nearly dry state which economizes an appreciable quantity of fuel; they are at once ready to disintegrate fresh ore.

Solutions containing chromates and caustic alkalis if agitated together with alcohol render up these latter to the alcohol even if the solution is concentrated. There is formed a lower layer containing the entire sodium or potassium chromate content (and if originally present, carbonates, aluminates and silicates) while the caustic alkalis after one or more mixing operations remain completely with the alcohol.

If sodium or potassium ferrite is present in the crude disintegrated mass this product is destroyed by steam or otherwise, either before or after the extraction by the solvents, if these latter do not themselves lead to the decomposition of the ferrite.

The second phase of the process has for its object to obtain pure chromate salts. Sodium or potassium chromate mixed with hydrate, silicate or aluminate of sodium or potassium, either alone or mixed together, can be freed from these salts accompanying them by the employment of carbonic acid. The chromates may be treated indifferently in a dry pulverized state, or in solution, preferably a concentrated solution. By treating the pulverized product, or its solution, sufficiently long with carbonic acid, the chromates remain unaltered, while the silicates and aluminates are transformed into silica and alumina in the state of hydrates which are insoluble in water. The carbonates formed by the carbon dioxid, as well as the sodium or potassium hydrate, if present, or the carbonates originally present, are transformed into bicarbonates which also are practically insoluble in relatively concentrated solutions of sodium or potassium chromate. If the chromates are in the dry state it will only be necessary to extract them with the least possible quantity of water. If they are already in solution it is only necessary to filter them and so obtain solutions of chromates which give by evaporation of the water these products in a chemically pure state.

It is to be understood that alumina and silica will equally well be precipitated by the sodium or potassium carbonate resulting, for example, from a preceding operation; in this case the caustic alkalis which may be present are transformed into carbonates.

The first phase of the process is preferably applied in the case in which there is a relatively large quantity of caustic alkali to be removed; the employment of the second phase is self indicated.

Claim—

1. An improved process for isolating chromium salts from chrome ores treated with caustic alkalis which consists in dissolving the caustic alkalis from their mixture with chromates alone or mixed with other salts with the aid of organic solvents and in the further separation of the carbonates, aluminates and silicates of sodium or potassium from the alkaline chromates by the employment of carbonic acid, substantially as described.

2. In the process of isolating chromium salts from ores treated with alkaline carbonates and containing carbonates, aluminates and silicates of sodium and potassium consisting in subjecting the said mixture to the action of carbonic acid and thereby separating the alkaline carbonates, the alumina and silica.

3. In the process of isolating chromium salts from chrome ores treated with caustic alkalis and containing carbonates, aluminates and silicates of sodium or potassium, consisting in subjecting the said mixture to the solvent action of ethyl alcohol and thereby separating the caustic alkalis from the alkali-treated chrome ore.

In testimony whereof I have signed this specification in the presence of two subscribing witnesses.

GERHARD NICOLAAS VIS.

Witnesses:
 JOHN F. SIMONS,
 GASTON DE NESTRA.